Figure 1:
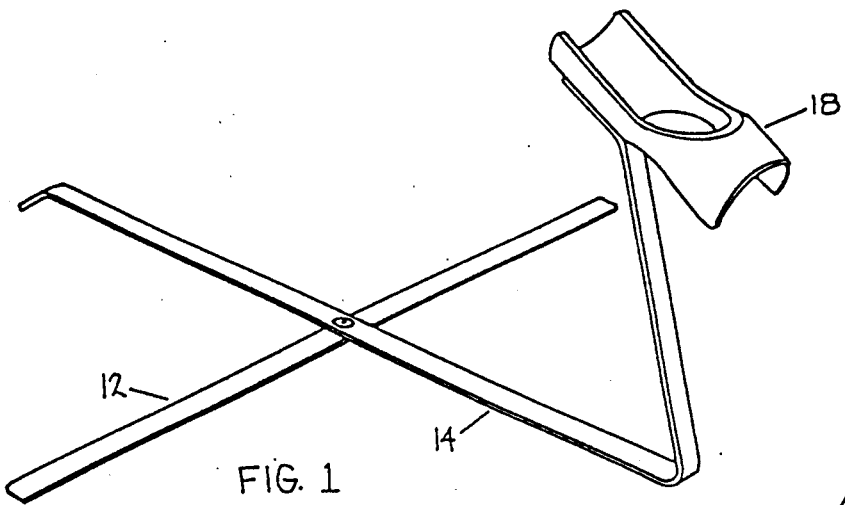

United States Patent [19]

Gessner

[11] Patent Number: 5,038,511
[45] Date of Patent: Aug. 13, 1991

[54] ICE FISHING ROD HOLDER

[76] Inventor: Ronald A. Gessner, P.O. Box 1123, Bozeman, Mont. 59715

[21] Appl. No.: 422,307

[22] Filed: Oct. 16, 1989

[51] Int. Cl.$^5$ .............................................. A01K 97/10
[52] U.S. Cl. .................................... 43/21.2; 248/528; 248/529
[58] Field of Search .................. 43/17, 21.2; 248/520, 248/525, 528, 529, 530, 533, 534, 535

[56] References Cited

U.S. PATENT DOCUMENTS

| 1,330,314 | 2/1920 | Gott et al. | 43/17 |
| 2,049,407 | 7/1936 | Clark | 248/520 |
| 2,899,155 | 8/1959 | Rogers | 248/529 |
| 3,147,563 | 9/1964 | Molter | 43/17 |
| 3,186,666 | 6/1965 | Williams | 248/520 |
| 4,236,339 | 12/1980 | White | 43/17 |
| 4,479,322 | 10/1984 | Koppel | 248/528 |
| 4,620,387 | 11/1986 | Bloom | 43/17 |
| 4,916,847 | 4/1990 | Ruszo | 43/21.2 |

Primary Examiner—Kurt Rowan

[57] ABSTRACT

A fishing rod holder to be used while ice fishing. This rod holder will hold the rod and reel off the ice and snow. This prevents the rod and reel from freezing up and possibly causing loss of fish. Because this rod holder just sets on the ice, it is completely portable and can easily be moved from ice hole to ice hole. The frame is designed to remain in its set-up position. Even with a fish tugging on the rod, the rod holder stays in its upright position. The rod and reel or stand will not be pulled through the ice hole. Since this rod holder is collapsible, it can be easily hauled and stored.

3 Claims, 1 Drawing Sheet

U.S. Patent    Aug. 13, 1991    5,038,511

ICE FISHING ROD HOLDER

BACKGROUND

1. FIELD OF INVENTION

This invention relates to a folding stand which sets on the ice for the purpose of holding an ice fishing rod.

2. Description of Prior Art

Many ice fishermen lay their ice fishing rods directly on the ice, causing reels to freeze up or even loss of rod and reel due to fish pulling said rod and reel through the ice hole.

Heretofore a variety of rod stands have been proposed and implemented for holding ice fishing rods.

One such resembles a clothespin. It consists of two short plastic legs which are held together with a spring. The user attaches this stand directly to the rod. However, the reel still rests directly on the ice. Also, fish can pull the rod, reel and stand through the ice hole.

Another type of rod stand consists of a large spike and plastic cup that can be attached to said spike. With this rod stand, the user must drive the spike into the ice. This requires carrying an extra tool. Once the spike is driven into the ice, the plastic cup is attached to the spike. The user then slips the rod handle of the ice rod into the plastic cup. Users find this undersirable due to immobility from one ice hole to the next.

One other product of similar nature, is an ice rod with a stand attached. This product is very cumbersome. And since this system comes with an ice rod already attached, all ice rods already in the users possesion would become unusable.

Ice fishermen therefore, would find it desirable to have a rod stand for their ice pole that would solve the unique problems of ice fishing.

Accordingly, I claim the following as my objects and advantages: to provide a stand for ice fishing rods that holds both rod and reel off the ice preventing ice build up in the reel, a stand that is readily mobile to allow moving the ice rod with ease, a stand which will allow rod and reel to be pulled through the ice, and a stand that can be used with most ice fishing rods already in existence.

In addition, I claim the following objects and advantages: to provide an ice rod holder that collapes for easy hauling, set-up and storage.

Readers will find further objects and advantages of the invention from a consideration of the ensuing description and the accompanying drawings.

DRAWING FIGURES

FIG 1. shows a perspective view of the ice rod holder in a set-up position.

Figure 2:
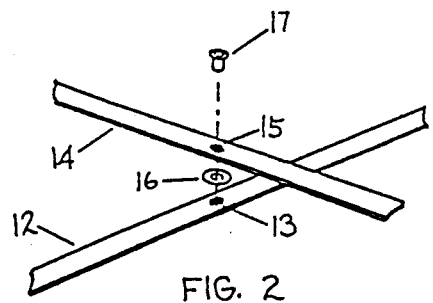

FIG. 2. is an exploded view of the stand assembly.

Figure 3:
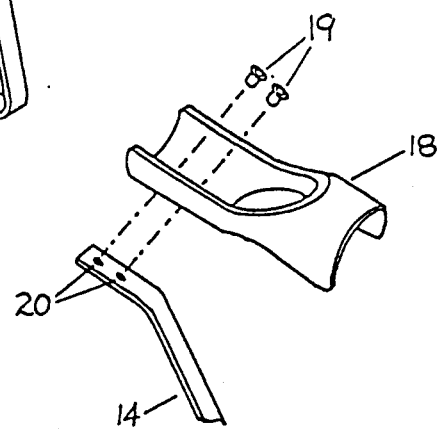

FIG. 3. is an exploded view of the stand to rod handle mount assembly.

Figure 4:
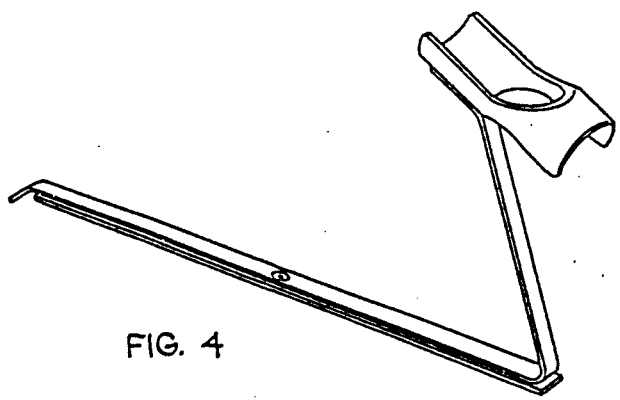

FIG. 4. shows a perspective view of the ice rod holder in a folded position.

Figure 5:
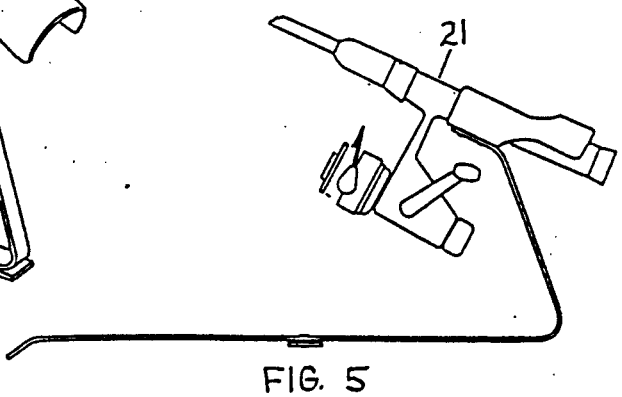

FIG. 5. shows the side view of the ice rod holder with a rod and reel on the stand.

DRAWING REFERENCE NUMERALS 12 cross frame piece
13 hole in 12 for rivet
14 main frame piece
15 hole in 14 for rivet
16 washer
17 rivet for frame
18 rod handle mount
19 rivets for holding rod handle mount 18 to frame
20 holes in 14 attaching 18
21 rod and reel

DESCRIPTION

FIG. 1 shows a complete rod holder. The rod holder consists of two main components, the frame and the rod handle mount. The frame is made of two ½" wide metal pieces. Cross piece 12 is 15 inches long. The main piece 14 is 22 ½ inches long with bends to accomodate stability and mounting of rod handle mount 18.

FIG. 2 shows how the frame is assembled. Rivet 17 goes through hole 15 in frame piece 14, next through washer 16, and finally through hole 13 in frame piece 12.

The rod handle mount 18 is 1 ¼ inch plastic tubing, 3 ½ inches long. It has ½ inch cuts on top and bottom of each.

FIG. 3 shows how rod handle mount 18 is attached to the frame. Rivets 19 go through two holes (not shown) in rod handle mount 18. They then go through two holes 20 in main frame piece 14.

ICE ROD HOLDER OPERATION

FIG. 4 shows the ice rod holder in the folded position. This configuration is ideal for hauling and storage. When ready for use, simply pivot frame piece 12 to form a cross with main piece 14. The rod holder will now look like FIG. 1.

The next step for use is to set ice rod holder a short distance in front of ice hole. This distance will vary depending on length of rod being used. The ice rod and reel 21 can then be placed in the rod handle mount 18, as shown in FIG. 5. The placement of the ice rod holder should now be adjusted so line from rod and reel 21 will hang straight down and through the ice hole.

Though a simple device, this ice rod holder solves many problems. The rod and reel are up off the ice. This prevents buildup of ice and snow on the rod and reel. Due to the nature of the design of the frame and rod handle mount, the rod and reel cannot be pulled through the ice. The ability to easily move and fold up this ice rod holder makes this an ideal accessory for the ice fisherman.

I claim:

1. A collapsible fishing rod holder for ice fishing consisting essentially of a horizontal main frame piece and a horizontal cross frame piece pivotally joined near the median point of each piece; said main frame piece having an integrally formed raised portion at one end; a tubular rod holder attached to the end of said raised portion of the main frame piece to releasably retain a fishing rod.

2. The construction set forth in claim 1 wherein said cross frame piece being attached to said main frame piece by means of a rivet allowing folding of said frame pieces.

3. The construction set forth in claim 1 wherein said tubular rod holder having cutouts; the front section having a cutout on the top, the back section having a cutout on the bottom.

* * * * *

UNITED STATES PATENT AND TRADEMARK OFFICE
CERTIFICATE OF CORRECTION

PATENT NO. : 5,038,511
DATED : August 13, 1991
INVENTOR(S) : Ronald A. Gessner

It is certified that error appears in the above-indentified patent and that said Letters Patent is hereby corrected as shown below:

Column 1, line 41, add the word "not" so the text reads as follows:
--"a stand which will not allow rod and reel to be pulled through the ice--".

Signed and Sealed this

Twenty-eighth Day of September, 1993

Attest:

BRUCE LEHMAN

Attesting Officer

Commissioner of Patents and Trademarks